June 17, 1969    K. F. HALL    3,449,851
POLE MOUNTED FISHHOOK HOLDER AND GUARD
Filed Sept. 18, 1967
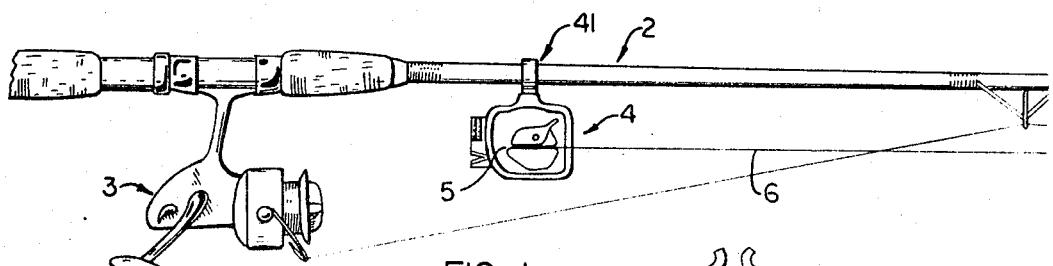
FIG. 1
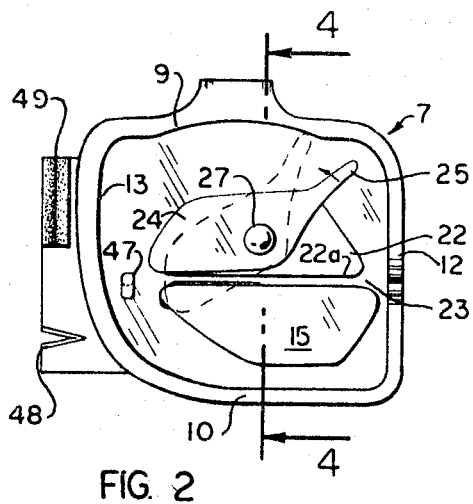
FIG. 2
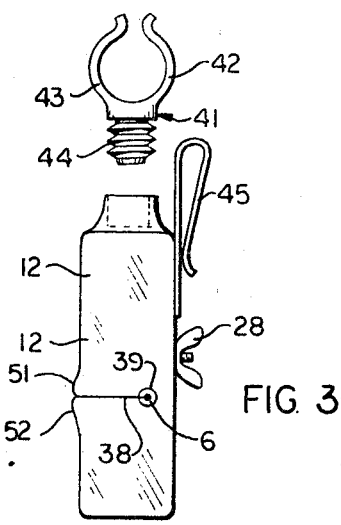
FIG. 3
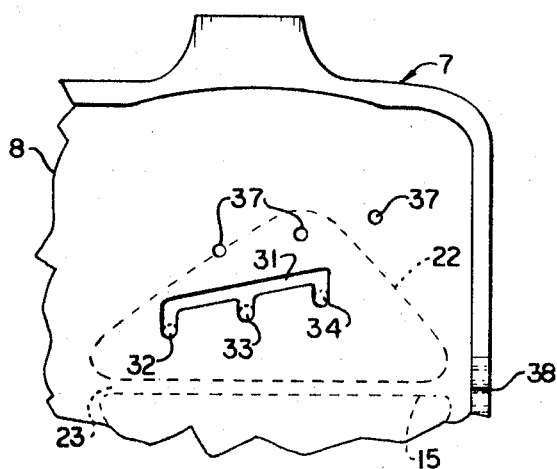
FIG. 6
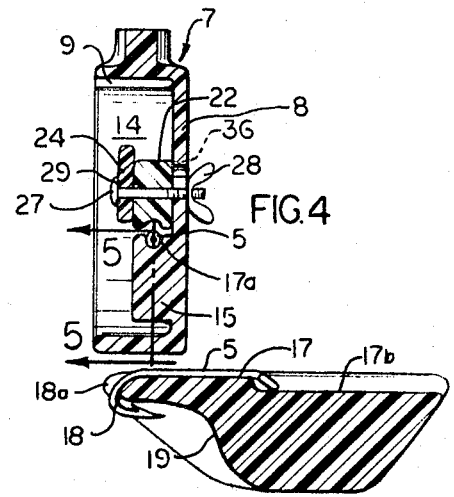
FIG. 4
FIG. 5
INVENTOR.
KENNETH F. HALL
BY
*McGrew & Edwards*
ATTORNEYS

United States Patent Office

3,449,851
Patented June 17, 1969

3,449,851
POLE MOUNTED FISHHOOK HOLDER AND GUARD
Kenneth F. Hall, 9205 W. 73rd Place,
Arvada, Colo. 80002
Filed Sept. 18, 1967, Ser. No. 668,423
Int. Cl. A01k *87/00, 97/12*
U.S. Cl. 43—25.2        11 Claims

ABSTRACT OF THE DISCLOSURE

A fishhook holder and guard comprising a body being formed to provide a backing wall and a recessed portion. A hook support is disposed in recessed portion on backing wall and upper piece is disposed in the recessed portion in spaced relation with the upper surface of the hook support to provide slot for receiving hook shank. The hook support has the upper surface for supporting the shank portion of a hook and an abutment end surface in spaced relation to the end wall for engaging inner curved portion of hook adjoining the shank. A movable arm in the recessed portion for closing portion of slot to hold hook against lateral movement moves in a plane substantially parallel to the backing wall. The forward end wall of the body has a narrow opening through which the line attached to the hook disposed on the support extends.

---

My invention relates to fishing devices and more particularly to a novel hook holder and guard or hooks attached to the line on a pole.

Fishhooks of various types when attached to the end of a line or a fish pole frequently become tangled, are capable of producing bodily injury, and may become damaged. Forms of hook holders suitable for use with a rod have been provided and while useful, have not been entirely satisfactory for all hook applications.

Accordingly, it is an object of this invention to provide an improved hook holder and guard for hooks attached to the line of a fish pole which is simple in construction, durable and convenient to use.

Another object of this invention is to provide a holder and guard for fishhooks which is easily constructed of a molded material such as plastic, which is not bulky and is easily carried on the person such as in a pocket and which may be easily attached to and removed from fish poles.

Another object of this invention is to provide a pole mounted holder and guard for fishhooks which is easily adjustable to accommodate hooks of various types, sizes and configurations.

Still a further object of this invention is to provide a pole mounted hook holder and guard which will protect persons from accidental injury while also protecting the hook barb and point from damage and tangling and also protect a fly or similar hook dressing.

Other objects, advantages and capabilities of my invention will become apparent as the following description proceeds taken in conjunction with the accompanying drawings in which:

FIG. 1 is a side elvation view of a fishhook holder and guard mounted adjoining the handle of a pole portion having a hook on the end of the line disposed in position;

FIG. 2 is a side elevation view of the open side of the fishhook holder and guard of FIG. 1 drawn to an enlarged scale with an open position of the lever arm indicated in full lines and a closed position in broken lines;

FIG. 3 is a front elevation view of the holder and guard shown in FIG. 2 having a clip along the backing wall for attachment to the pocket of the user and coupling for attachment to the pole shown in a detached position about the body;

FIG. 4 is a sectional view taken along lines 4—4 of FIG. 2 showing a preferred mounting of the upper piece and lever arm on the backing wall by a wing nut and bolt assembly;

FIG. 5 is a sectional view taken along lines 5—5 of FIG. 4 showing a preferred shaping of the hook support with a hook disposed in a seated position thereon; and FIG. 6 is a fragmentary side elevation view of the body taken with the lever arm and upper piece removed and showing a slotted portion in the backing wall which permits adjustment of the elevation of the upper piece to accommodate various types and sizes of hooks.

Referring now to the drawings, in FIG. 1 there is shown an assembly of a rod or pole 2, reel 3 and the hook holder and guard 4 embodying features of the present invention mounted on the pole adjoining the reel with a hook 5 secured at the end of the fastening line 6 and in position in the holder and guard 4.

The hook holder and guard 4 as more fully illustrated in FIGS. 2–6 is in the form of a generally flat body 7 preferably constructed of a molded plastic and shaped to fit in the pocket of the user and being formed to provide a backing member or wall 8 and a closure wall or continuous rim-like portion inclusive of a top wall portion 9, bottom wall portion 10, and front and rear end wall portions 12 and 13 projecting outwardly from the backing wall 8 to form a shallow recessed portion or cavity 14 leaving a wall open oppositely of the backing member for access.

A base or hook support 15 is disposed within the recessed portion 14 on the inner face of wall 8 and preferably will be molded as an integral part of the backing wall 8 with its outer face disposed substantially within the outer extremities of the closure wall so as to be shielded or guarded thereby with the inner surfaces of this wall being substantially spaced from the ends of the hook support 15.

This hook support 15 is formed with an upper elongated surface 17 preferably having an arcuate recessed portion 17a as shown in FIG. 4 in which the shank portion of the hook will seat and a narrow, arcuate rearward abutment surface 18 in spaced proximity to the inner wall 13. Abutment surface 18 is preferably set in from the rearmost extremity 18A of the support and engages the inner curved portion or throat of the hook adjoining the shank so as to dispose and hold the point of the hook and barb of the hook in spaced relation from an inclined surface 19 which extends forwardly from the abutment surface to provide a guard for various sizes of hooks. The upper surface of support 15 is also provided with a more pronounced recessed portion 17b adjoining its forward end for receiving the eyelet portion of the hook as shown.

An upper piece 22 is disposed above the support 15 having an undersurface 22a disposed in spaced and facing relation to the upper surface of the support to provide a slot or narrow elongated passage 23 in the recessed portion of the body. This slot is formed of a sufficient size to receive the shank portion of the hook and permit it to be positioned on the upper surface of support 15. After insertion, the hook 5 is then drawn forwardly by the line 6 so as to engage the abutment surface 18. The outer sides or faces of the support 15 and upper piece 22 are preferably in the same plane and although the upper piece may be molded as an integral part of the body as is support 15, it is preferably formed separately and adjustable vertically as hereafter described.

A lever arm 24 is pivotally mounted in the recessed portion of the body and preferably in side-by-side relation to the upper piece 22 while still within the outer extremities of the closure walls 9, 10, 12 and 13. Lever arm 24 has a handle portion 25 projecting upwardly and shaped for easy engagement of tripping by the user to open and close a portion of the slot 23. The undersurface of the lever arm is generally parallel with the adjoining undersurface of the upper piece in the open position and moves to close or cover the slot and the barb end of the hook to guard bth user and hok when closed as shown in broken lines.

A preferred arrangement for mounting lever arm 24 on the body is by means of a bolt 27 threaded at one end extending through apertures formed in the arm 24, upper piece 22, and backing wall 8 having a suitable fastener such as a wing-type nut 28 disposed on the outside of the body. The bolt may carry a suitable nylon bushing or washer 29 which will assist in holding the arm in a snug friction fitting relation with the abutting surfaces of the bolt head and upper piece to permit the arm 24 to be pivoted between the open and closed positions shown in FIG. 2.

In conjunction with this preferred mounting of the arm 24 and upper piece 22, there is provided an arrangement for selective adjustment of the upper piece toward and away from the support 15 to regulate the width or side of the slot 23. The arrangement shown includes the forming of a slot 31 inclined to the horizontal in the backing wall 8 and apertures 32, 33 and 34 below and in communication with the slot 31 disposed adjoining each end and intermediate the ends for purposes of illustration. This slot and associated apertures are of sufficient size to permit the bolt 27 to slide freely therein. in this manner, the position of the upper piece may be easily adjusted for a selected size of hook and for dressed hooks prior to its insertion into slot 23 by loosening the wing nut 28 and sliding the bolt along the slot and into a selected one of the apertures. Although only three apertures have been shown, it is understood that more than three may easily be formed along the slot for additional settings. To prevent the upper piece from rotating, a bead 36 may be formed on the inner side of piece 22 which will fit in an adjoining recess 37 in the backing plate 8 at each setting.

The forward closure wall 12 of the body is provided with a central aperture preferably in the form of a metal eyelet 39 mounted in the body centrally of wall 12 through which the line 6 extends when the hook is in position on the support. A pair of opposing surfaces are formed in wall 12 preferably in closely spaced relationship or abutting relationship define a narrowed slit 38 from the outer edge of the wall to the eyelet 39 through which the line 6 may be passed after the hook is in position so as to hold the line in the eyelet. These surfaces when made of a molded plastic provide a yieldable surface permitting the line to pass through the slit. In a preferred form a pair of upper and lower portions 51 and 52 are formed on the outer edge of wall 12 to provide guide surfaces or a lip for assisting in insertion of the line into the slit and eyelet. Once the hook is in position and the line is in eyelet 39, the handle of the reel 3 is turned so as to draw the line and pull the hook against the abutment surface 18. The lever arm 24 is then pivoted downward to close the slot and cover a portion of the hook as shown in broken lines.

A preferred attachment for the body to the ple is a cupling member 41 having a pair of spaced finger-like portions 42 and 43 preferably of a metal such as spring steel lined with plastic or the like which will slip over the rod in a snug fitting relationship with a threaded portion 44 at the other end whch will thread into an aperture in the upper closure wall 9 of the body. A clip member 45 which may be of metal or plastic is provided along the outer surface of the body for clipping to the pocket of the user when not assembled on a pole.

For accommodating other forms of attachment devices commonly secured to the end of a fish line, such as a swivel, there may be provided a suitable post 47 formed in a portion of the body on the inner side of wall 8 rearwardly of the slot. Further, it is preferred to provide a cutting blade 48 and a sharpening stone 49 mounted on a portion of the body rearwardly of wall 13 which will permit complete servicing of the fishing gear such as the hook and line. While the rearward portion of the body which supports the cutting blade and sharpening stone may be essentially a solid platsic piece as shown, other arrangements may also be employed with an interconnecting molded piece. Various shapes of stones may be provided including beveled edges and grooves to perform the required sharpening functions.

While the present invention has been described with reference to particular structure, there is no intent to limit the spirit and scope of the precise details except as defined.

I claim:

1. A fishhook holder and guard for fishing rods comprising a body adapted to be supported from a fishing rod and being formed to provide a backing wall portion on one side, a recessed portion opening to the other side of said body, and a hook support portion in said recessed portion, having first and second surfaces arranged in a generally transverse relation to one another and projecting inwardly from said backing wall portion, a piece disposed in the recessed portion and having a surface in oppositely disposed relation with said first surface of said support to provide a slot through which the shank portion of a hook is inserted and from which the hook is withdrawn, said hook support portion having said first surface for supporting the shank portion of said hook inserted through said slot and said second surface providing an abutment for engaging the curved portion of the hook adjoining the shank, an arm in said recessed portion and mounted to move in a plane substantially parallel to the plane of the backing wall portion while alternately covering and uncovering a portion of the slot and hook while said arm remains in said recessed portion, said body having an aperture in a front end wall portion through which a line extending from the attachment to the hook to the front end of the pole extends, and means for detachably fastening said body in a depending manner to a fishing rod.

2. A fishhook holder and guard as set forth in claim 1 wherein said body includes means for detachably fastenin same to the pocket of a user.

3. A fishhook holder and guard as set forth in claim 1 wherein said piece is movably adjustably mounted in said recessed portion to different settings in spaced relation to said support portion to accommodate hooks of different sizes and types.

4. A fishhook holder and guard as set forth in claim 2 wherein said detachable fastening means for the body is threaded at one end to thread into a top of the upper wall portion of said body.

5. A fishhook holder and guard for fishing rods as set forth in claim 1 wherein said body is formed of a molded plastic material.

6. A fishhook holder and guard as set forth in claim 1 wherein said body is shaped to fit in the pocket of a user.

7. A fishhook holder and guard as set forth in claim 1 wherein opposing surfaces adjoining the aperture of said front end wall portion hold the line in said aperture and provide a yieldable slit through which the line is moved when removing the hook from the support.

8. A fishhook holder and guard as set forth in claim 1 wherein said piece and arm are mounted on a common shaft supported from said backing wall.

9. A fishhook holder and guard for fishing rods comprising a body adapted to be supported from a fishing rod and being formed to provide a backing wall on one side and an inner recessed portion opening to the other side of said body and leaving an access opening to the recessed portion oppositely of said backing wall, a hook support disposed on said backing wall in said recessed portion, having first and second surfaces arranged in a generally transverse relation to one another and projecting inwardly from said backing wall portion, a piece disposed in the recessed portion and having a surface in facing relation with said first surface of said support to provide a slot through which the shank portion of a hook is inserted and from which the hook is withdrawn, said hook support having said first surface for supporting the shank portion of said hook inserted through said slot and said second surface in spaced relation to a rear wall portion of the body and providing an abutment for engaging the curved portion of the hook adjoining the shank, a movable arm in said recessed portion on said piece for alternately covering and uncovering a portion of the slot and hook while said arm remains in said recessed portion, said body having an aperture in a front end wall portion through which a line extending from the attachment to the hook to the front end of the pole extends, and means for detachably fastening said body in a depending manner to a fishing rod.

10. A fishhook holder comprising a body being formed to provide a backing wall portion on one side, a recessed portion opening to the other side of said body and at least one projecting portion disposed on the backing wall portion in said recessed portion and having a first surface projecting inwardly from said backing wall portion on which the shank portion of a hook is seated, and having an abutment surface in a transverse relation to said first surface and projecting inwardly from said backing wall portion for engaging the curved portion of the hook, arm means mounted to move in a plane substantially parallel to the plane of the backing wall portion and in said recessed portion while alternately covering and uncovering a portion of the hook while said arm means remains in said recessed portion, and means for detachably fastening said body in a depending manner to a support means.

11. A fishhook holder and guard for fishing rods comprising a body adapted to be supported from a fishing rod and being formed to provide a backing wall on one side and an inner recessed portion opening to the other side of said body and leaving an access opening to the recessed portion oppositely of said backing wall, a hook support disposed on said backing wall in said recessed portion, having first and second surfaces arranged in a generally transverse relation to one another and projecting inwardly from said backing wall portion, a piece disposed in the recessed portion and having a surface in facing relation with said first surface of said support to provide a slot through which the shank portion of a hook is inserted and from which the hook is withdrawn, said hook support having said first surface for supporting the shank portion of said hook inserted through said slot and said second surface in spaced relation to a rear wall portion of the body providing an abutment for engaging the curved portion of the hook adjoining the shank, a movable arm in said recessed portion and on said piece for alternately covering and uncovering a portion of the slot and hook, said arm and said piece being carried on a common shaft extending through an inclined slotted portion in the backing wall in which the shaft is slidably disposed for moving said upper piece toward and away from said support, said shaft having a fastening member disposed on the outer side of the back wall for holding said piece at a preselected position for a particular hook, said body having an aperture in a front end wall portion through which a line extending from the attachment to the hook to the front end of the pole extends, and means for detachably fastening said body in a depending manner to a fishing rod.

References Cited

UNITED STATES PATENTS

| | | | |
|---|---|---|---|
| 847,298 | 3/1907 | Sullivan | 43—25.2 |
| 1,269,743 | 6/1918 | Richmond | 43—25.2 |
| 1,365,111 | 1/1921 | Lawrence | 43—57.5 |
| 2,763,957 | 9/1956 | Roberts | 43—57.5 |
| 2,849,825 | 9/1958 | Reisner | 43—25.2 |
| 3,141,258 | 7/1964 | Mayer | 43—25.2 X |

FOREIGN PATENTS

| | | |
|---|---|---|
| 264,888 | 10/1964 | Australia. |
| 25,339 | 1905 | Great Britain. |
| 698,318 | 10/1953 | Great Britain. |
| 225,941 | 6/1943 | Switzerland. |

SAMUEL KOREN, *Primary Examiner.*

JAMES H. CZERWONKY, *Assistant Examiner.*

U.S. Cl. X.R.

43—57.5